Oct. 9, 1934.  F. M. CARROLL  1,976,600
CARD PUNCHING MACHINE
Filed April 19, 1930    13 Sheets-Sheet 1
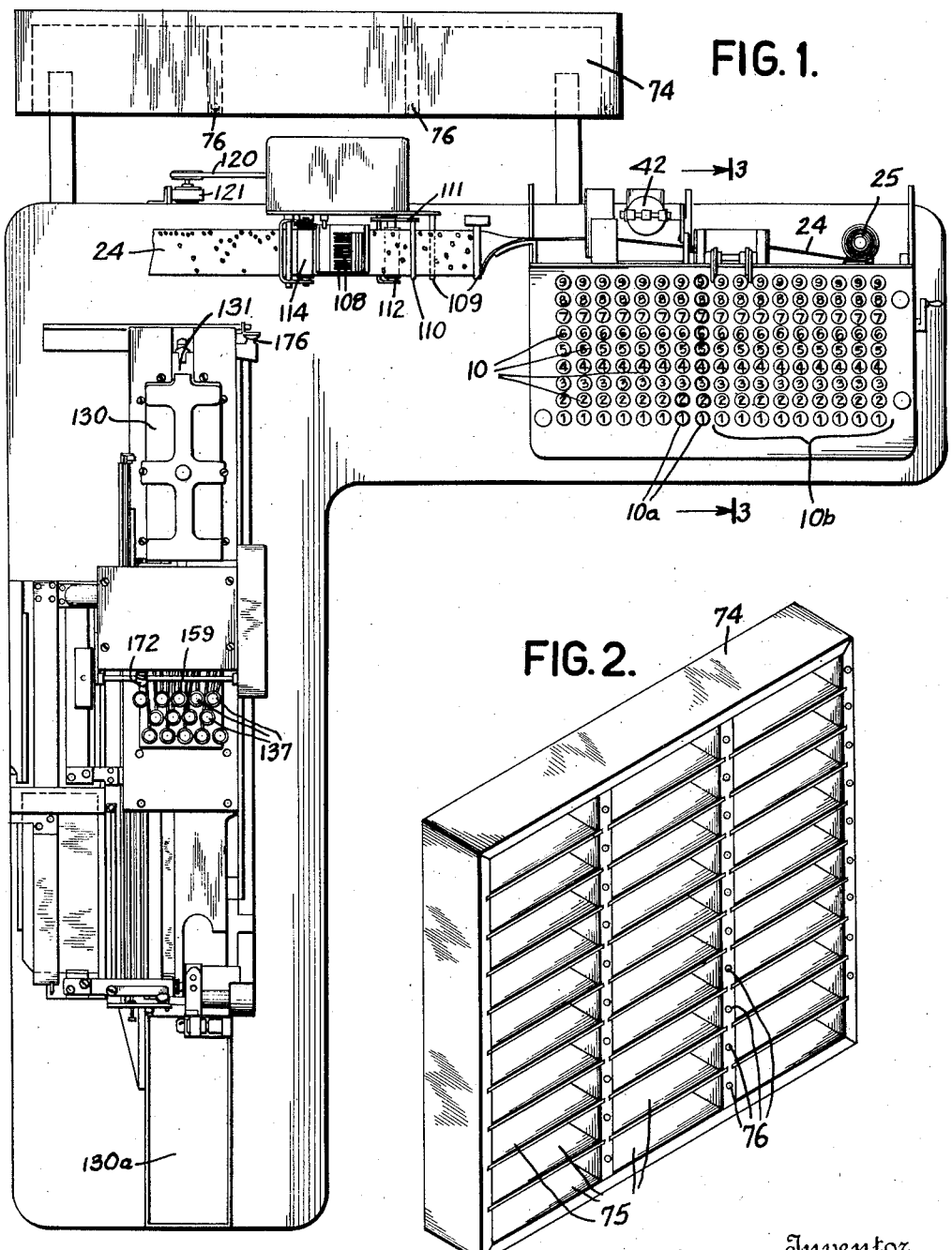

Oct. 9, 1934.  F. M. CARROLL  1,976,600
CARD PUNCHING MACHINE
Filed April 19, 1930   13 Sheets-Sheet 2

Inventor
Fred M. Carroll
By his Attorney

Oct. 9, 1934.  F. M. CARROLL  1,976,600
CARD PUNCHING MACHINE
Filed April 19, 1930    13 Sheets-Sheet 3
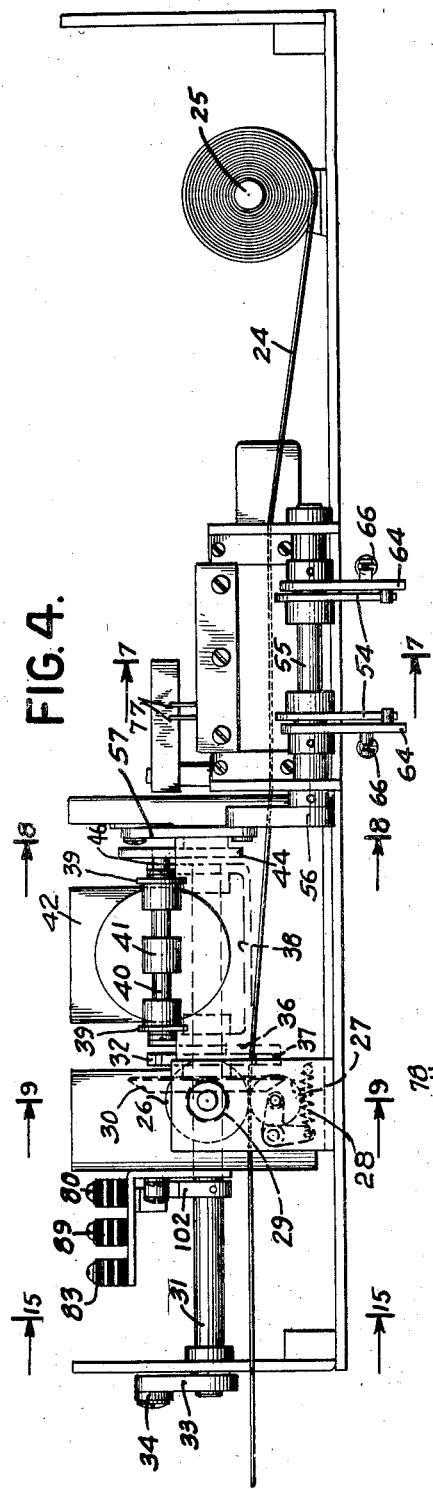
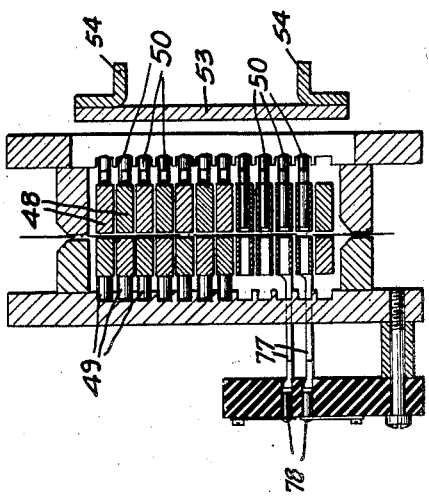
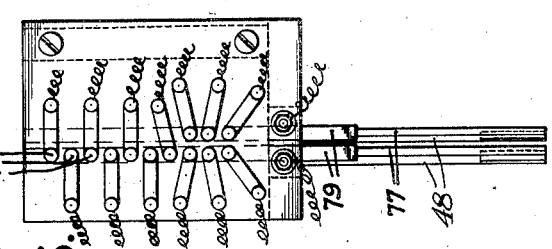
Inventor
F. M. Carroll
By his Attorney Oct. 9, 1934.   F. M. CARROLL   1,976,600
CARD PUNCHING MACHINE
Filed April 19, 1930   13 Sheets-Sheet 4

Inventor
F. M. Carroll
By his Attorney
W. M. Wilson

Oct. 9, 1934.                F. M. CARROLL                 1,976,600
                          CARD PUNCHING MACHINE
                    Filed April 19, 1930        13 Sheets-Sheet 5

Inventor
F. M. Carroll
By his Attorney
W M Wilson

Oct. 9, 1934.   F. M. CARROLL   1,976,600
CARD PUNCHING MACHINE
Filed April 19, 1930   13 Sheets-Sheet 6

Oct. 9, 1934.    F. M. CARROLL    1,976,600
CARD PUNCHING MACHINE
Filed April 19, 1930    13 Sheets-Sheet 7
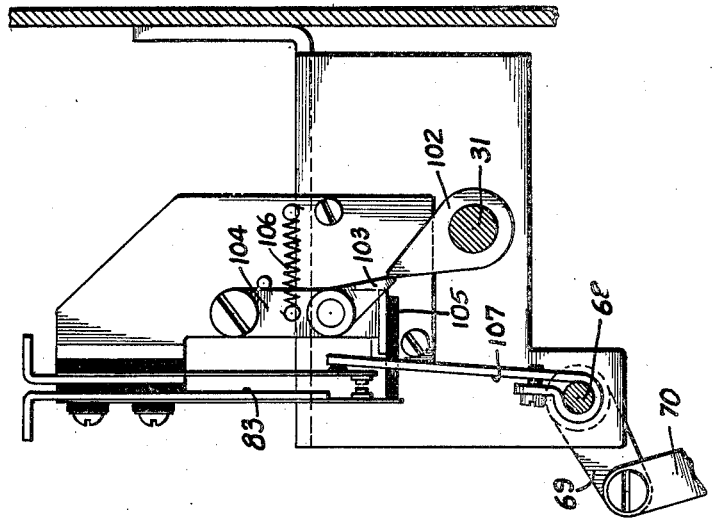
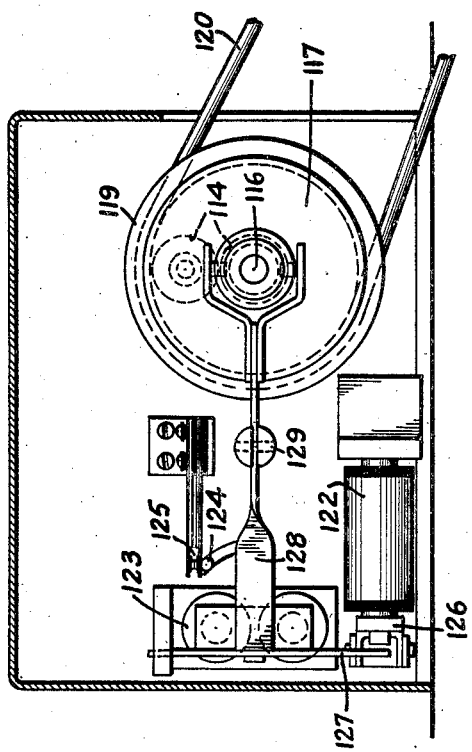
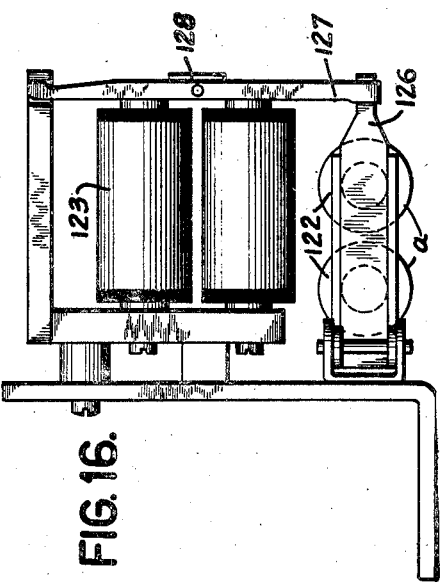

Oct. 9, 1934.  F. M. CARROLL  1,976,600
CARD PUNCHING MACHINE
Filed April 19, 1930   13 Sheets-Sheet 8

Inventor
F. M. Carroll
By his Attorney

Oct. 9, 1934.  F. M. CARROLL  1,976,600
CARD PUNCHING MACHINE
Filed April 19, 1930   13 Sheets-Sheet 11
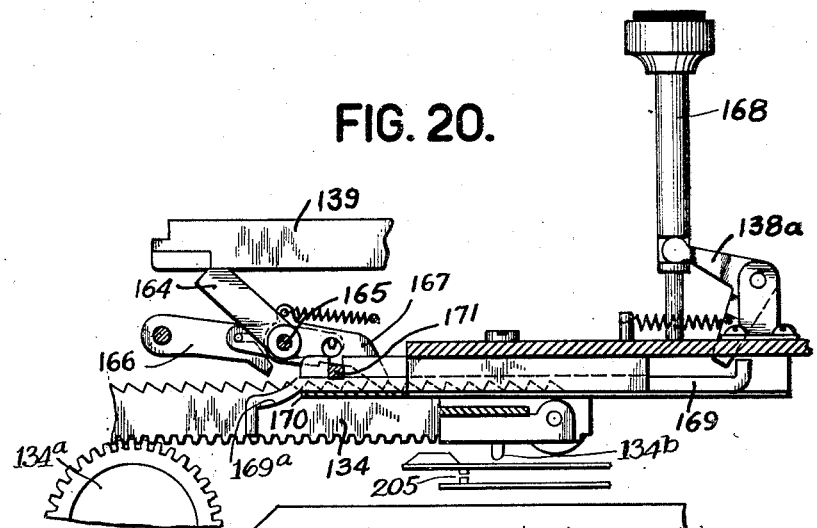
FIG. 20.
FIG. 21.
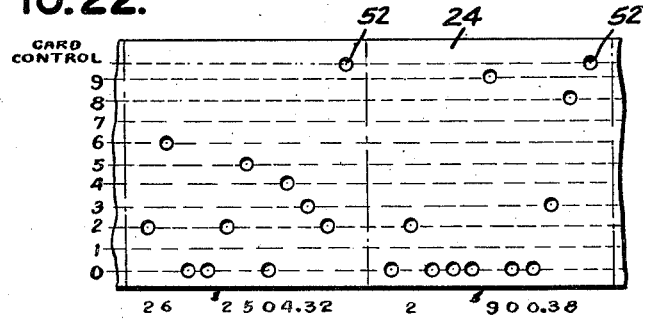
FIG. 22.
Inventor
F. M. Carroll
By his Attorney
WM Wilson Oct. 9, 1934.  F. M. CARROLL  1,976,600
CARD PUNCHING MACHINE
Filed April 19, 1930  13 Sheets-Sheet 13
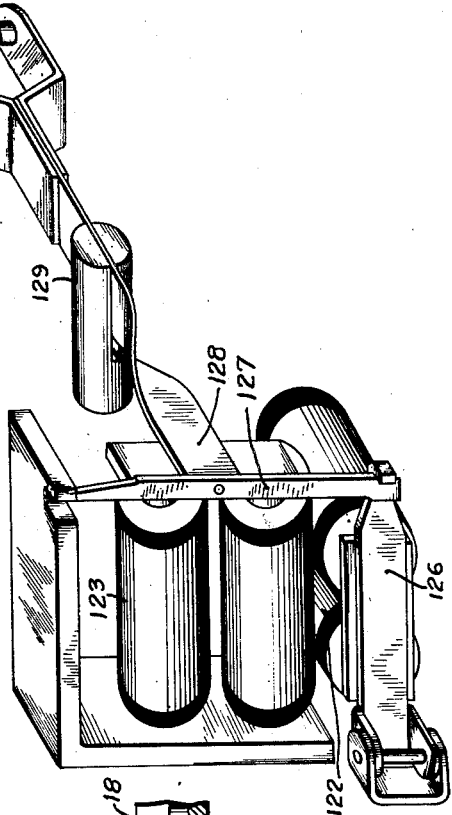
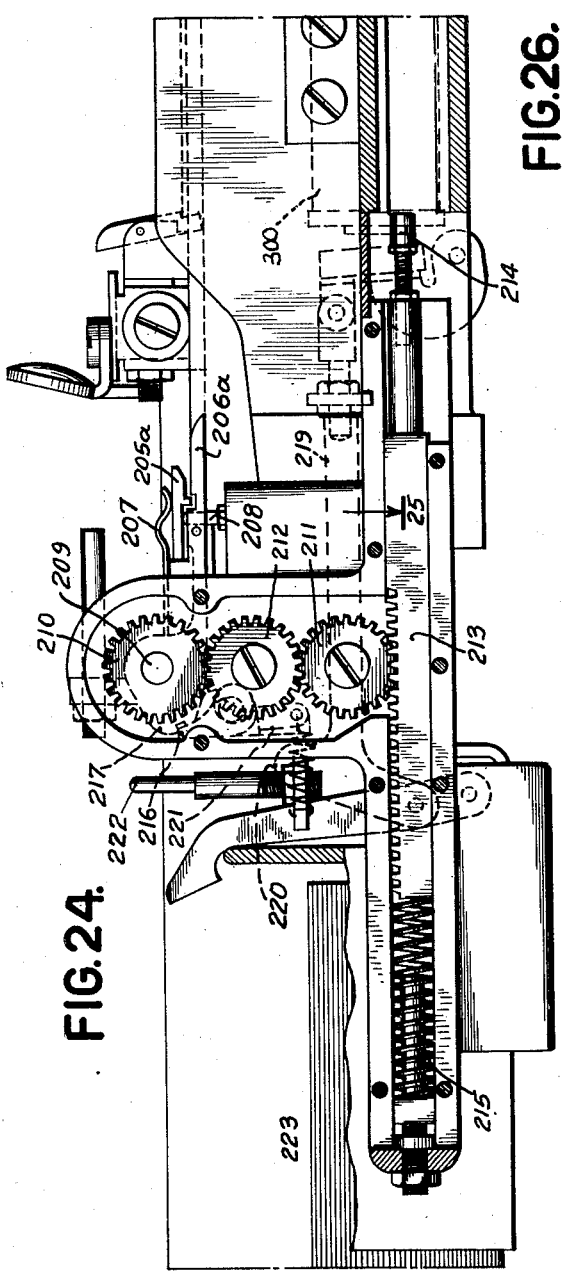
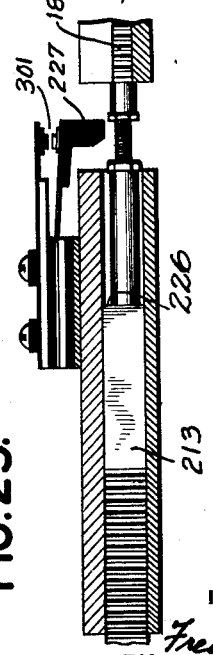
INVENTOR
Fred M. Carroll
BY
W. M. Wilson
ATTORNEY Patented Oct. 9, 1934

1,976,600

UNITED STATES PATENT OFFICE 1,976,600

CARD PUNCHING MACHINE

Fred M. Carroll, Yonkers, N. Y., assignor, by mesne assignments, to International Business Machines Corporation, New York, N. Y., a corporation of New York Application April 19, 1930, Serial No. 445,614

6 Claims. (Cl. 235—58)

This invention pertains to devices for punching record cards such as are used in Hollerith tabulating machines, whereby the cards are punched while an adding machine is being operated.

It is sometimes desirable, as in banking systems where at the end of the day checks are listed on an adding machine, to record each check in permanent form, as on a tabulating card, so that the data may be sorted, tabulated, listed, or classified by tabulating machines of known type, and my present invention covers a device which automatically punches a record of a transaction under control of the adding machine.

One of the objects of the invention resides in the provision of means whereby an adding machine of the key set, handle operated type may be utilized to control the operation of a punching device. After the setting of the keys is made the handle or other actuating mechanism is brought into operation which operation brings about an entry of the amount set up by the keys, into the registering devices.

According to the present invention provision is made for controlling the operation of a card punching mechanism in accordance with the amounts set up by the keys of an adding machine and according to the preferred embodiment this mechanism includes a tape which is adapted to receive the information so set up in the form of perforations, during the period that the item is being entered into the register by the actuating mechanism.

A further object of my present invention is to provide a device which will permit adding machines of known type to be used in connection with card punches of known type, the operation of the punch being controlled through supplementary devices which I provide between the adding machine and the punching machine.

Another object is to provide a device intermediate an adding machine and a punch comprising a tape which is adapted to receive a plurality of columns of punchings in accordance with the amount entered into the adding machine, such columns of punchings being made simultaneously. This tape is subsequently analyzed while in motion to control a punch of the step by step or column by column type to enter the information on a tabulating card.

A further object resides in the provision of means for controlling a ten digit punching mechanism by and in accordance with the operations of a double motion accounting machine.

When the adding or accounting machine is used in the usual manner, the forward motion of the operating handle sets up punches which perforate a record tape and on the back stroke this tape is advanced to a device which analyzes the perforations electrically and causes the step by step operation of the card punch to enter the data in the card thereby making a permanent record of the amount.

Another object is to provide a sorting device in connection with an adding machine which upon entry into the adding machine of designating information contained on a check will indicate the pocket in which the check may be deposited.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a plan view of the complete device.

Fig. 2 is a perspective view of the compartment box into which the checks are sorted.

Fig. 4 is an enlarged view of parts shown in Fig. 1 showing tape feeding mechanism.

Fig. 5 is a section on line 5—5 of Fig. 7.

Fig. 6 is a section on line 6—6 of Fig. 7.

Fig. 14 is a detail of the tape feeding clutch.

Fig. 15 is a detail taken on line 15—15 of Fig. 4.

Fig. 16 is an end view of Fig. 14, looking from the left.

Fig. 20 is a detail view of the card carriage releasing mechanism.

Fig. 21 is a fragment of a perforated card.

Fig. 22 is a fragment of a tape.

Fig. 24 is a view showing the card ejecting devices;

Fig. 25 is a section taken on line 25—25 of Fig. 24;

Fig. 26 is an isometric view showing parts disclosed in Figs. 14 and 16.

In order that the detail description may be followed to better advantage, a general statement will be herein given of the operation of the specific embodiment of the invention shown, and the apparatus will be described as being applied to a banking system but it is understood that the invention may with equal facility be used in any other commercial establishment and in many other relations.

A plurality of promiscuous checks may contain in the usual manner upon the faces thereof a bank or clearing house number and an amount, which the operator enters on the keyboard of the adding machine in the regular manner. For instance, if a check bears bank number 18 and is issued for twenty-five dollars and seventy cents these figures are set up on the keys. The adding machine is then operated in the usual way by rocking its handle thus causing a light to flash at pocket number 18 which is one of a series of compartments each assigned to a particular bank number. The operator deposits the check in this indicated pocket. Simultaneous with the flashing of the signal light a plurality of punches are forced through a recording tape to indicate thereon the bank number together with the amount of the check. On the return stroke of the handle the tape is advanced to position to receive an entry in accordance with the next following keyboard set up. A second tape may be wound about the regular adding machine platen to receive printed impressions of these various items in the usual manner.

The perforated tape is advanced with a continuous motion between electric analyzing brushes and blocks and the perforations therein sensed to cause operation of magnetically controlled punches in a type of card punch adapted to automatically advance cards, singly, to punching position where they are punched column by column and to eject the same when punching has been effected thereon. A special perforation contained on the tape is adapted to cause this automatic operation of the punch to present cards to position to receive the various independent entries made on the tape and the operator is not required to attend to the punch other than to keep the feed magazine supplied with blank cards.

Operation of the adding machine

Figure 3:
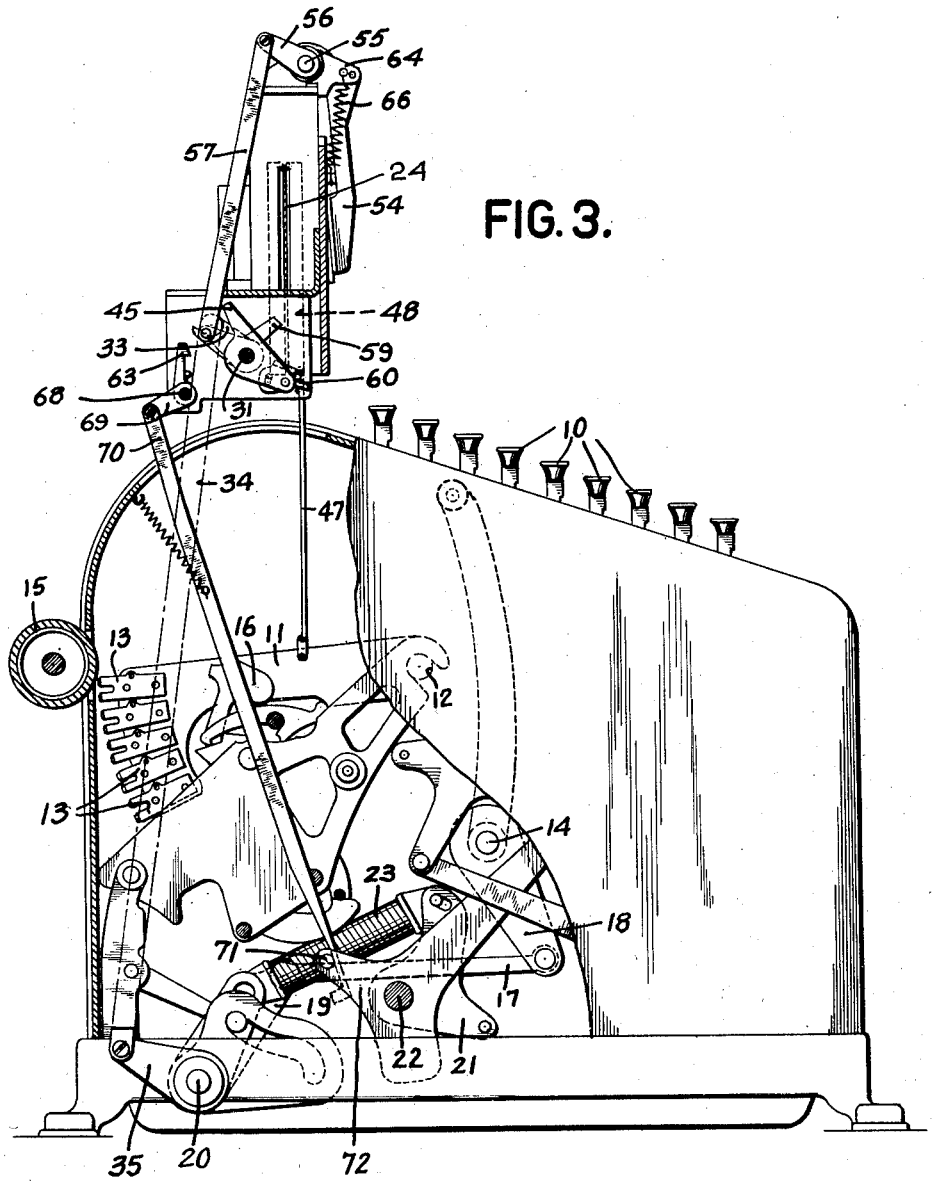
Fig. 3 is a view partly in section of an adding machine with a tape punching attachment in place. The view is taken substantially on the line 3—3 of Fig. 1.

Referring to Figs. 1 and 3, in the typical adding machine which I have used for purposes of illustration, depression of key 10 positions stops which determine the extent of movement of segmental racks (not shown) which are mounted on the forward ends of levers 11, which are loosely hung on a cross-shaft 12 and carry at their rear ends a series of type plates 13 bearing type for printing numerals.

The operating handle of the machine is mounted on shaft 14 and when it is drawn forward will operate the usual mechanism which raises levers 11 and positions type opposite platen 15 for the printing of the amount represented by the depressed keys. The printing is effected as the handle reaches the end of its forward stroke by pivoted hammers 16 striking type plates 13.

When shaft 14 is rocked by the operating handle in a clockwise direction in Fig. 3, link 17 is pushed rearwardly by arm 18 fast on shaft 14. The rear end of link 17 is connected to the upper end of arm 19 pivoted on shaft 20. Member 21 fast on shaft 22 which is the main shaft of the machine, is connected to the upper end of arm 19 by the coil spring 23 so that when the handle is drawn forward shafts 20 and 22 are both rocked counterclockwise and when the handle is returned to its home position both shafts rotate clockwise to their normal positions, and type carrying lever 11 drops to its lowest position as shown in Fig. 3.

The purpose of the resilient connection from arm 19 to member 21 is to prevent possible shock from the operating handle being communicated to the main shaft 22 and through shaft 22 to the delicate working parts of the machine.

Having explained such parts of the adding machine as are essential to an understanding of my invention, I shall now describe the parts and devices I have added to carry out the purposes of my invention.

Feeding the tape

Figure 9:
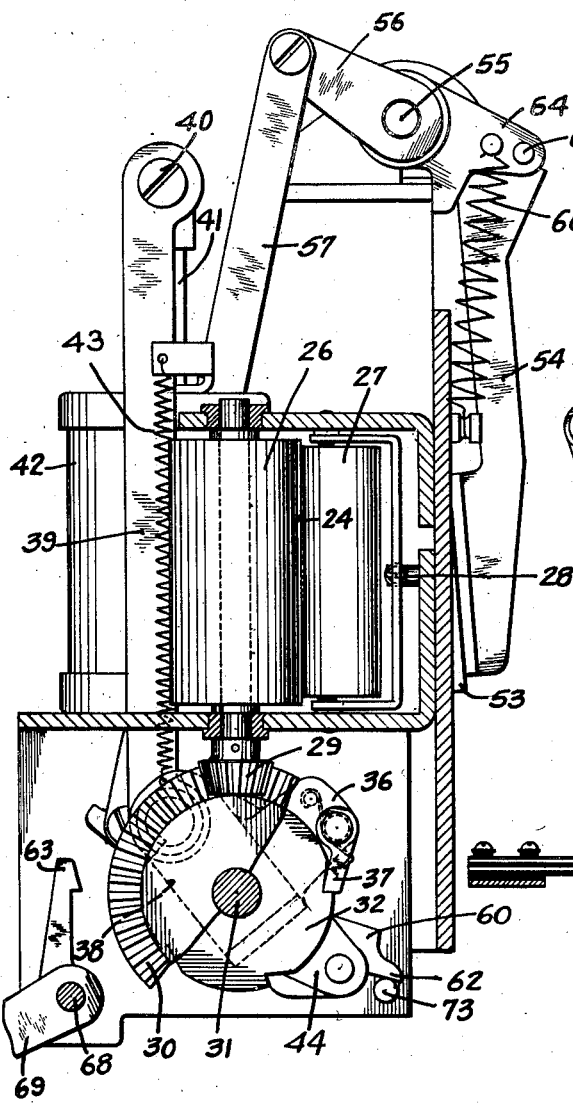
Fig. 9 is a section on line 9—9 of Fig. 4.

In Figs. 1 and 4 the tape 24 is wound upon a spool 25 and guided through the punch section, as shown, to a pair of feed rollers 26 and 27 (see also Fig. 9). A spring 28 urges the roller 27 into close frictional engagement with the roller 26 which is driven in the following manner.

A bevel pinion 29 secured to the roller 26 meshes with a bevel gear 30 loose on shaft 31 and having secured thereto a notched disk 32 (see also Figs. 3 and 4). The shaft 31 has fast at its outer end an arm 33 connected by a link 34 to an arm 35 on shaft 20 which as we have seen rocks in a counterclockwise direction upon the forward movement of the operating handle so that through the above linkage the shaft 31 is also rocked in the same direction.

In Fig. 9 the shaft 31 has pivoted thereon an arm 36 which carries a spring pressed pawl 37 riding on the periphery of disk 32. Integral with arm 36 is a bail 38 which has pivoted thereto vertically extending links 39, tied together at their free ends by a rod 40 (Fig. 4) from which is suspended the plunger 41 of a dash pot 42. The bail 38 has also attached thereto springs 43 tending to turn the bail 38 in a clockwise direction.

Figure 8:
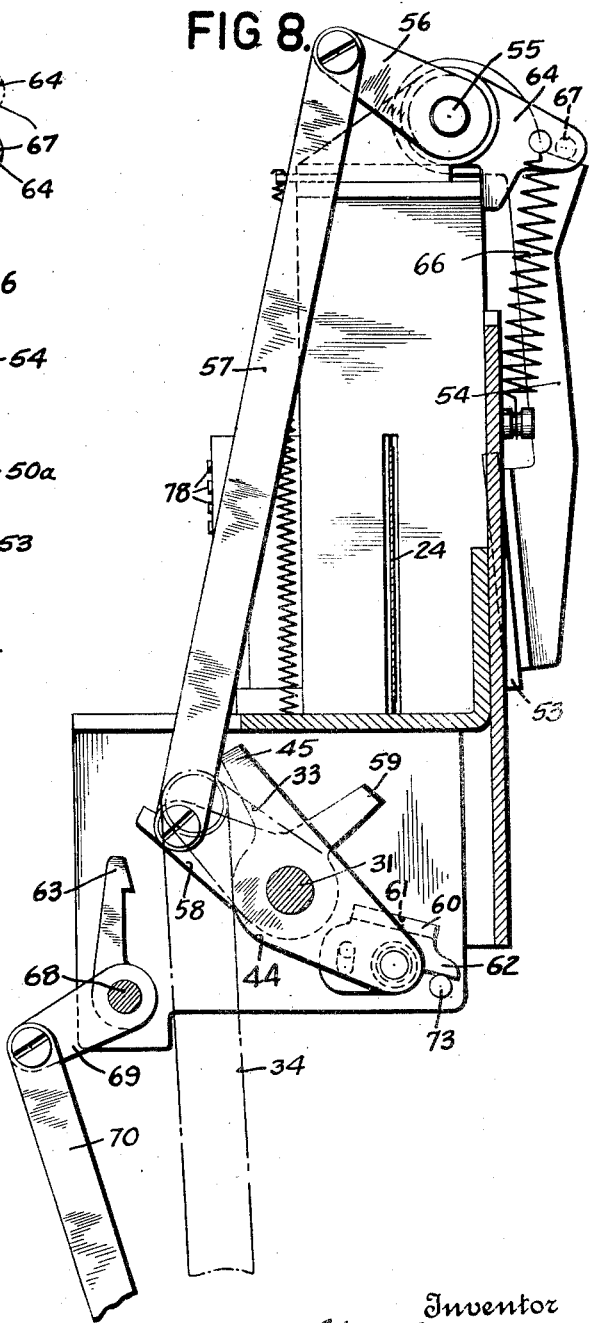
Fig. 8 is a section on line 8—8 of Fig. 4.
Figure 10:
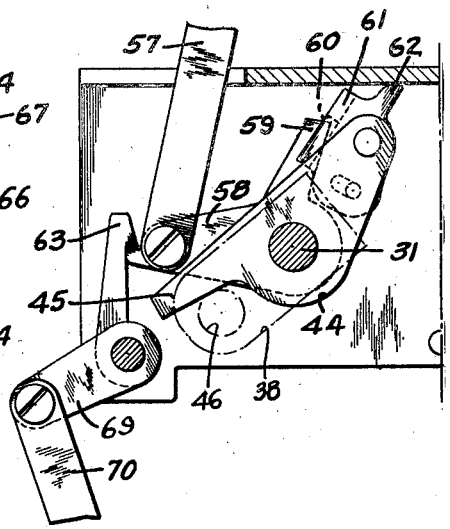
Fig. 10 is a position view of parts in Fig. 8.

Secured to the shaft 31 (see Figs. 4 and 10) is a lever 44 having an extension 45 adapted to cooperate with a pin 46 extending from the bail 38 so that upon counterclockwise rotation of the shaft 31 the lever 44 will be moved from the position of Fig. 8 to that of Fig. 10 moving therewith through the finger 45 and pin 46 the bail 38. This causes downward movement of the links 39 and the extension of the springs 43. During this movement the pawl 37 will have moved to engage the next tooth of the disk 32 so that when the shaft 31 returns to its original position, bail 38 will follow under the influence of springs 43 controlled by the dash pot 42 and the pawl 37 will pick up the disk 32, turning it, and through the bevel gears 29 and 30, actuating the roller 26. The tape is thus advanced to present a new portion thereof to the punches.

Operation of the tape punches

Figure 7:
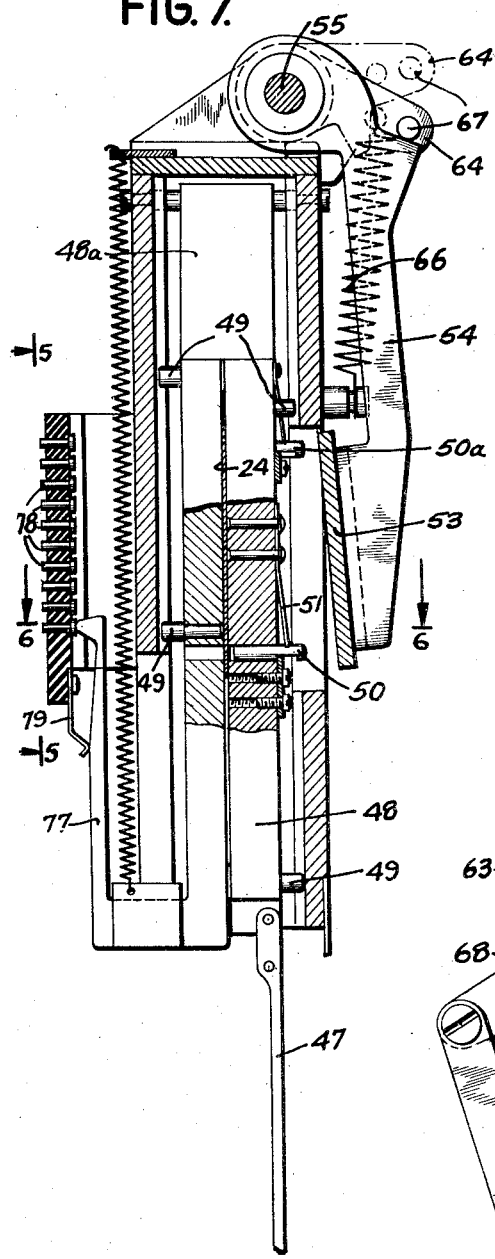
Fig. 7 is a sectional view of the tape punches taken on line 7—7 of Fig. 4.

Each of the adding machine levers 11 in Fig. 3 which are used for this operation and are controlled by the keys 10a in Fig. 1 and also those to the right as designated by 10b have upwardly extending link connections 47 (see also Fig. 7)

to the upper ends of which are pivoted punch sliders 48 one for each column under consideration. That is, two of these punch sliders are associated with a bank number and nine are associated with the amount. Referring also to Fig. 6, each of these sliders is guided for vertical movement by a number of pins 49 riveted thereto and adapted to move in suitable slots in the fixed frame of the device as shown. Each slider carries a punch 50 adapted to be held in normal position (Fig. 7) by a leaf spring 51. The tape 24 is adapted to pass between the two die portions of the slider without being affected by the vertical movement thereof. Thus as the type levers 11 are positioned differentially by the adding keys 10, the corresponding sliders 48 will also occupy differential positions with respect to the tape 24 so that upon actuation of the punches the amount set upon the key board will be recorded on the tape, in a manner as illustrated in Fig. 22, where a series of lines numbered 0 to 9 indicate the relative positions which the punches may occupy during an adding operation. An extra punch position labelled "Card control" is perforated by a fixed punch 50a which is mounted in a member 48a having no connecting link 47 and which is rigidly secured to the frame of the machine for holding the punch 50a in the same position.

Upon each adding operation of the machine, punches which have been set are forced through the tape 24 together with the special designating perforation 52. This special perforation, as will later be described, controls the operation of the card punching device. A common hammer plate 53 is provided which upon actuation strikes all the punches 50.

The normal position of the sliders is such that the punches 50 are on the zero line so that where there is none set to a significant figure, a zero hole will be perforated. The hammer plate 53 is carried by a pair of arms 54 (see Figs. 7 and 8) which are loosely pivoted upon a rod 55, one end of which has secured thereto an arm 56 connected by a link 57 to an arm 58 which has an extension 59 adapted to cooperate with a latch 60 (see also Fig. 10). The operation of the parts is such that as the shaft 31 turns in a counterclockwise direction carrying therewith the latch 60, a shoulder 61 on the latch will engage the extension 59 and move it from the position of Fig. 8 to that of Fig. 10 where a nose 62 of the latch will strike the supporting structure of the machine causing clockwise tilting of the latch to move the shoulder 61 out of active engagement with the extension 59. A hook 63 is adapted to engage the arm 58 and hold it in the position of Fig. 10, thus holding the link 57 depressed and through the arm 56 holding a pair of arms 64 secured to the shaft 55 in their dotted line position of Fig. 7. The arms 65 have attached thereto springs 66 which are thus stretched. Upon release of the arm 58 by the hook 53, the spring 66 will draw downwardly upon the arm 64 and through pins 67 extending therefrom will come into sudden engagement with the arms 54 to impel the hammer plate 53 against the punches. The manner of releasing the hook 63 will now be explained.

The hook is secured to a rod 68 which at its outer end carries an arm 69 which has pivoted thereto a depending link 70 (see also Fig. 3). The lower end of this link is hook-shaped and is adapted to be engaged by a pin 71 mounted on an arm 72 which is secured to the main operating shaft 22 of the adding machine. The time of operation of the parts is such that towards the end of the forward stroke of the operating handle or the end of the counterclockwise movement of the shaft 22, the pin 71 will engage the hook end of the latch 70 drawing the latter downwardly to cause release of the arm 58 which has just previously been latched into the position of Fig. 10. Upon return of the shaft 31 to its clockwise position the nose 62 of the latch 60 will engage a fixed pin 73 to rock the latch back to the position of Fig. 8 from which it may again actuate the extension 59.

Briefly recounting the manner of perforating the tape 24, the keys 10a and 10b are set up to represent the bank number and amount of the particular check. The operating handle of the adding machine is then drawn forwardly which causes the setting of the various type hammers 13 and various punch slides 48. Toward the end of the forward stroke of the handle the hammer plate 53 is tripped to perforate the tape and the various printing hammers 16 are likewise tripped to cause printing of the corresponding information on the usual adding machine paper strip. After this perforating operation has been completed and the handle is permitted to return, the perforated portion of the tape will be advanced by the rollers 26 and 27 and a new unperforated portion will be presented to the punching field.

*Selecting of the sorting pocket*

As the bank number and amount of the check are being perforated on the tape, one of a plurality of sorting pockets is simultaneously designated by means of a light signal so that the operator may know into which pocket the check is to be deposited. In Fig. 2 a bin 74 is shown having a plurality of pockets 75 and a number of lights 76, one for each pocket. The arrangement is such that the pocket corresponding to the bank number of the particular check being sorted will have its associated light illuminated to draw this pocket to the attention of the operator.

In Figs. 5, 6, and 7, the two sliders 48 associated with the bank number carry insulated fingers 77 cooperating with a series of contact points 78 and adapted to receive current from contact sliders 79 bearing against the finger 77. The finger 77 associated with the units column of the bank number is adapted to traverse the range of the ten pins 78 shown in Fig. 7. The slider 77 associated with the tens column of the bank number, however, is limited to three positions, namely, zero, one and two, since in this embodiment of the invention the number of pockets has been restricted to 29.

Figure 23:
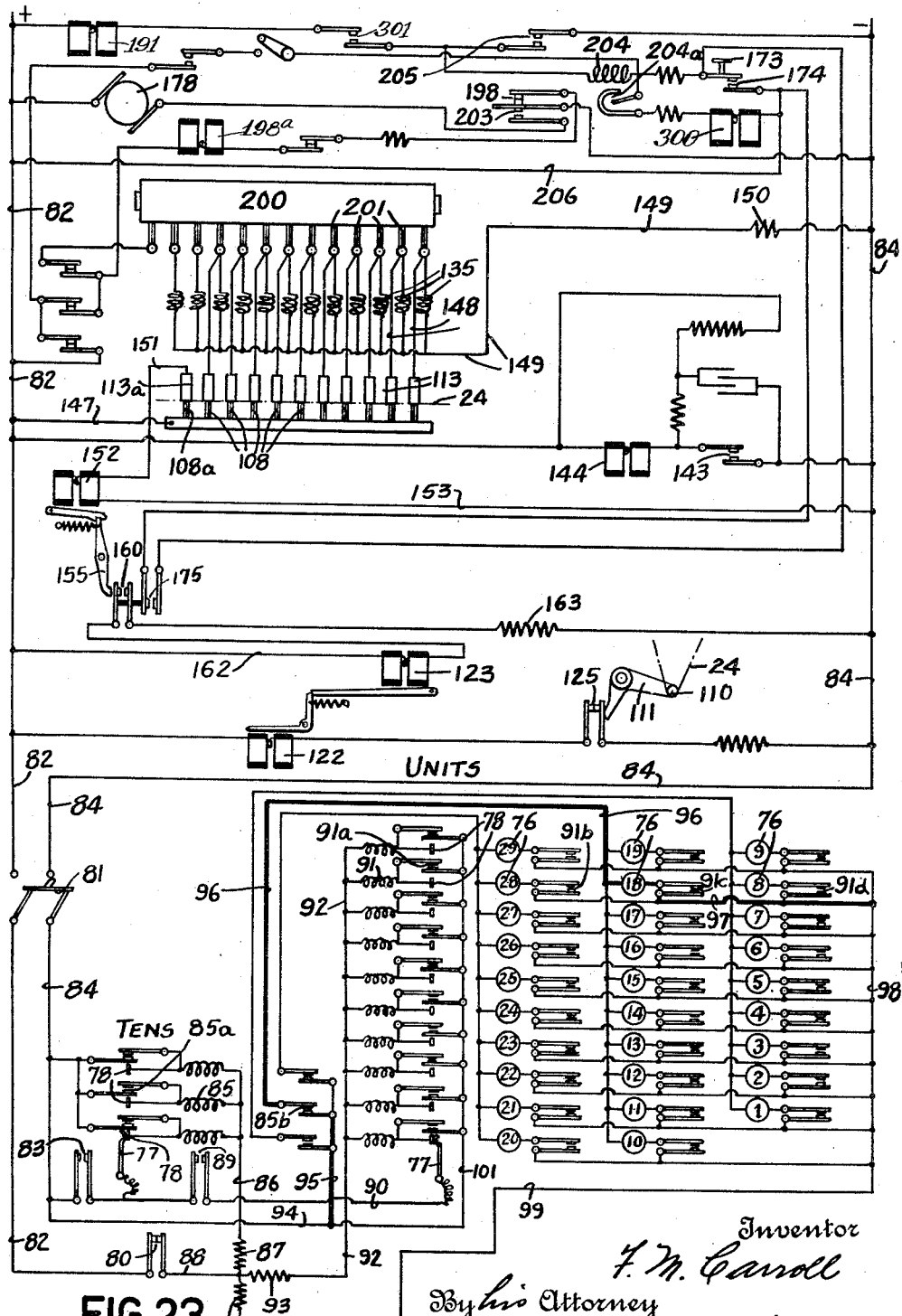
Fig. 23 is a wiring diagram of the electric circuit of the machine.

We will now refer to the electric circuit of the machine shown in Fig. 23 to explain how the particular light 76 is selected. A pair of contacts 80 are adapted to be opened momentarily during the operation of the adding machine to interrupt any circuits which may have been previously established through any of the lights 76. This, as can be seen if the main line switch 81 were closed, would interrupt any circuit by breaking the path from the side of the line 82.

Assuming the two sliders to have positioned themselves at some such number as 18, the tens slider 77 will be positioned against the second pin 78 of the tens column. Then the slider 77 of the units position will be positioned against the pin 78 second from the top of the units column. A pair of contacts 83 in a manner later to be described are adapted to close toward the end of the forward stroke of the operating handle of the machine. This establishes a circuit from the negative side of the line 84 through the contact 83, the tens slider 77, the pin 78 in the "one" position, through relay magnet 85, through wire 86, resistance 87, wire 88, contact 80 now closed, back to opposite side of line 82. The relay 85 may be of the usual telephone type of relay and is adapted to close a pair of contacts 85a and 85b. At the same instant a pair of contacts 89 adapted to close with the contacts 83 will establish the following circuit: from the negative side of the line 84, through the contact 83, contact 89, wire 90, units finger 77, the pin 78 of the "eight" position to a relay magnet 91, wire 92, resistance 93, wire 88, contact 80 and back to line 81. This energizes the relay 91 which is adapted to close a series of contacts 91a, 91b, 91c and 91d so that a circuit through the light of the eighteenth pocket may now be traced as follows: from the line 84, through wire 94, wire 95, contact 85b, now closed, wire 96, the light 18, contact 91c, wire 97, wire 98, wire 99, resistance 100, wire 88, contact 80, back to line 82. This causes illumination of the light 18 which will remain so lighted until the next operation of the machine. This circuit is maintained in the following manner.

The closure of the contact 85a by its relay magnet 85 establishes a holding circuit through this relay from the line 84, relay magnet 85, wire 86, resistance 87, wire 88, contact 80, back to the line 82. The holding circuit through magnet 91 is held in a similar manner from line 84, through wire 94, wire 101, to the contact 91a, relay coil 91, wire 92, resistance 93, wire 88, contact 80 and back to line 82.

As noted, both these holding circuits pass through the contact 80 which during the next entry in the adding machine is adapted to open momentarily thus interrupting the holding circuits and extinguishing the light so that a new light may be selected and in turn held until a subsequent operation. The example selected for explanation is illustrative of the manner in which any other light is selected and requires no further explanation.

Referring to Fig. 4, the three contacts 83, 89 and 80 are shown mounted upon a fixed portion of the machine. The contact 80 which we have seen as being normally closed, is adapted to be momentarily opened by the action of a cam arm 102 secured to the shaft 31 (see also Fig. 15). During the counterclockwise rocking of the shaft the cam arm 102 engages a by-pass 103 pivoted upon a swinging arm 104 which carries an insulating block 105 adapted to engage the outer blade of the contact 89 to open the same. The parts are so arranged that the arm 102 will move past the by-pass 103 allowing the same to return to the right under the influence of the spring 106. The later return of the cam arm 102 will move by the by-pass 103 without disturbing the arm 104. The other two contacts 83 and 89 which are normally open have the common plate 107 abutting their inner blades mounted upon the aforementioned rod 68. This rod as we have seen is rocked in a counterclockwise direction near the end of the forward movement of the handle of the machine and it is during this time that the contacts 83 and 89 are closed.

Analysis of the perforated tape

Figure 11:
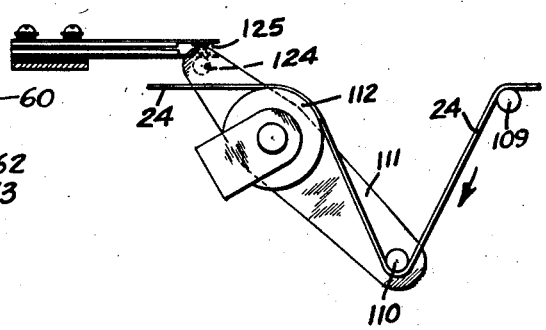
Fig. 11 is a view of a tape controlled contact.
Figure 12:
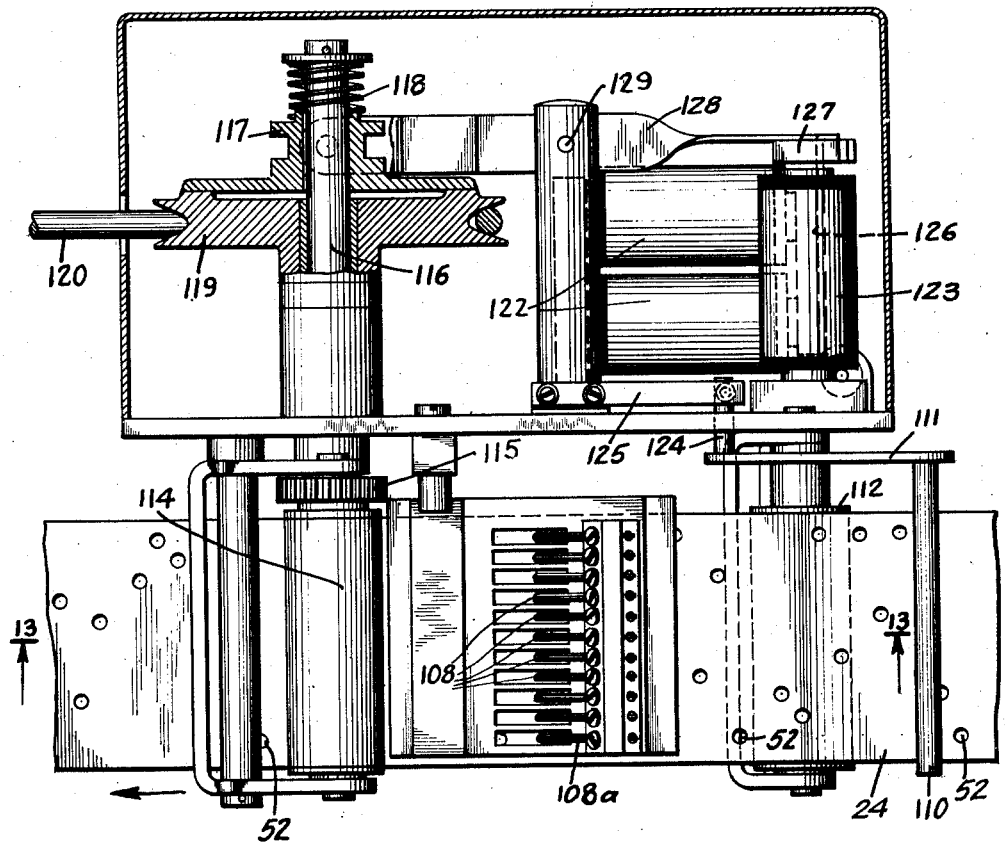
Fig. 12 is a plan detail of the tape analyzing mechanism.
Figure 13:
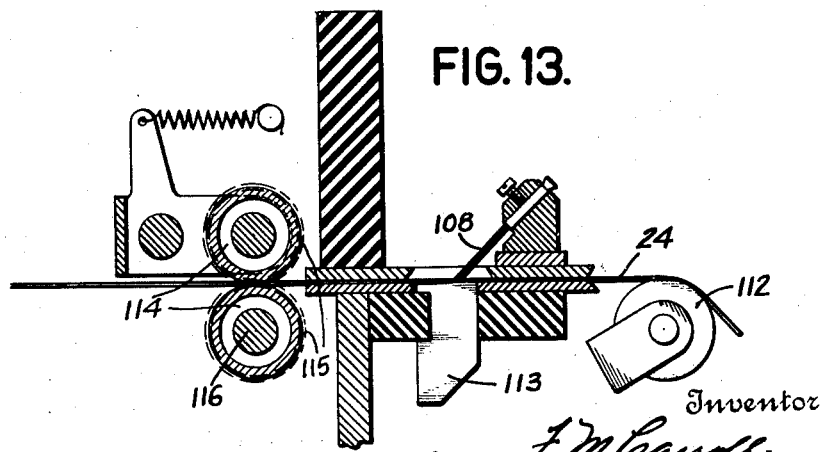
Fig. 13 is a section taken on line 13—13 of Fig. 12.

The tape as it passes from the punching section of the adding machine (see Fig. 1) is guided to an analyzing station where a series of electric brushes 108 sense the perforations therein (see Figs. 12 and 13). The tape as it passes from the punching station to the analyzing station is guided by fixed pins 109, from whence, as in Fig. 11, it is drawn in a direction indicated by the arrow, around a pin 110 secured to a lever 111 pivoted upon the axis of a roller 112. The cooperation of the tape with the pin 110 is adapted to control the operation of the tape feeding device in a manner to be later described.

From the roller 112 (Fig. 13) the tape advances past the brushes 108 of the insulated brush blocks 113 to a pair of feed rollers 114 which feed the tape forwardly. The rollers 114 are connected by gears 115 and the shaft 116 of the roller extends as shown in Fig. 12 to a clutch device, one element 117 of which is keyed to the shaft 116. A spring 118 is adapted to urge the member 117 into frictional engagement with a pulley 119 which is connected by a belt 120 to a constantly running shaft 121. This clutch device is controlled by two pairs of magnets 122 and 123 (see also Figs. 14 and 16).

In Fig. 12, with the member 117 in engagement with the pulley 119 the feed rollers 114 are adapted to draw upon the tape 24 to feed it past the brushes 118 at a constant rate. As we have seen, however, perforating of this tape and the feeding of the same past the punching station of the adding machine is an intermittent operation and, depending upon the skill and speed of the operator, such intermittent advance of the tape may be either slower or faster than the constant feeding of the tape past the analyzing brushes. Provision is therefore made to interrupt the feeding of the tape through the analyzing section when such feeding has taken up the slack between the two devices. Thus in Fig. 11 the constant pull on the tape 24 to the left will raise the pin 110 if the paper is taut. The opposite end of the arm 111 carries a pin 124 (see also Fig. 12) adapted to permit the opening of a pair of contacts 125.

Reference to the wiring diagram of Fig. 23 will disclose that this contact 125 is in series with the magnet 122 so that when the contact is open the magnet 122 is deenergized. However, during the normal operation of the machine the tape is sufficiently slack to allow closure of the contacts 125 and energization of the magnet 122 which in Figs. 12, 14 and 16 attracts its armature 126 to release the member 127 pivoted upon the end of clutch arm 128 which in turn is pivoted at 129 and connected at its opposite end to member 117.

Card punching mechanism

The card punching device herein illustrated is that shown in the copending application of Fred Lee and George Daly, Serial No. 391,874 filed September 11, 1929 and only so much of the operation thereof will be explained as is necessary for an understanding of the operation in connection with the present invention. In general the punch contains a feed magazine 130 (Figs. 1, 17, 18 and 19) from which the cards are fed singly from the bottom of the stack by a picker 131 which feeds the cards to a position under the punches 132 (Fig. 19) with the first column of the card in position to receive perforations. From this position the card is engaged at its rear edge by a pusher 133 mounted upon an escapement rack 134 which for each operation of the punches permits the advance of the card step by step. A series of magnets 135 is adapted to select the punches for actuation in the following manner. Associated with each magnet 135 is a pivoted armature 136 whose free end is connected to a key 137 which through a bell crank 138 moves an interposer bar 139 to the left in Fig. 19 where it cooperates with a punch bar 140. The forward movement of any interposer bar 139 is adapted to rock the bail 141 which in Fig. 18 is shown as being connected to a spring pressed depending link 142 whose lower free end is adapted to engage and close a contact 143. This, as is well explained in the aforementioned application, is adapted to close a circuit through the magnet 144 which through its armature 145 and link and bell crank connections 146 is adapted to draw downwardly on the pivoted punch bar 140 to force the selected interposer against the associated punch thus perforating the card.

In the present application the magnets 135 are connected to the analyzing brushes 108 with the magnet 135 corresponding to the nine position wired to the brush 108 corresponding to the nine position of the tape and so on so that where a perforation occurs in the tape it will cause the energization of the magnet 135 corresponding to the same index point position of the card to register the same on the card. The circuits involved in this magnet selection may be seen in connection with Fig. 23 where the common brushes 108 are connected by a wire 147 to the side of the line 82, from whence a circuit established through a hole in the card will continue through the blocks 113, through wires 148, magnets 135, wire 149, resistance 150, to the other side of line 84.

In the application referred to provision is made to energize magnets 135 under control of a pattern card having perforations which permit the establishment of circuits from a roller 200 to brushes 201 connected in series with magnets 135. For the purposes of the present invention a blank or unperforated card is placed in the pattern card carrier and there will be no effective functioning of brushes 201 and roller 200.

Tape feed control

As the tape 24 progresses through the analyzing device and after the data perforations thereon have caused selection of the punch magnets 135 to repeat such data on a tabulating card as shown in Fig. 21, the special hole 52 which accompanies each entry will coincide with a brush 108a (see Figs. 12 and 23). This will establish a circuit from line 82, wire 147, brush 108a, brush block 113a, wire 151, magnet 152, wire 153, back to line 84.

Figure 17:
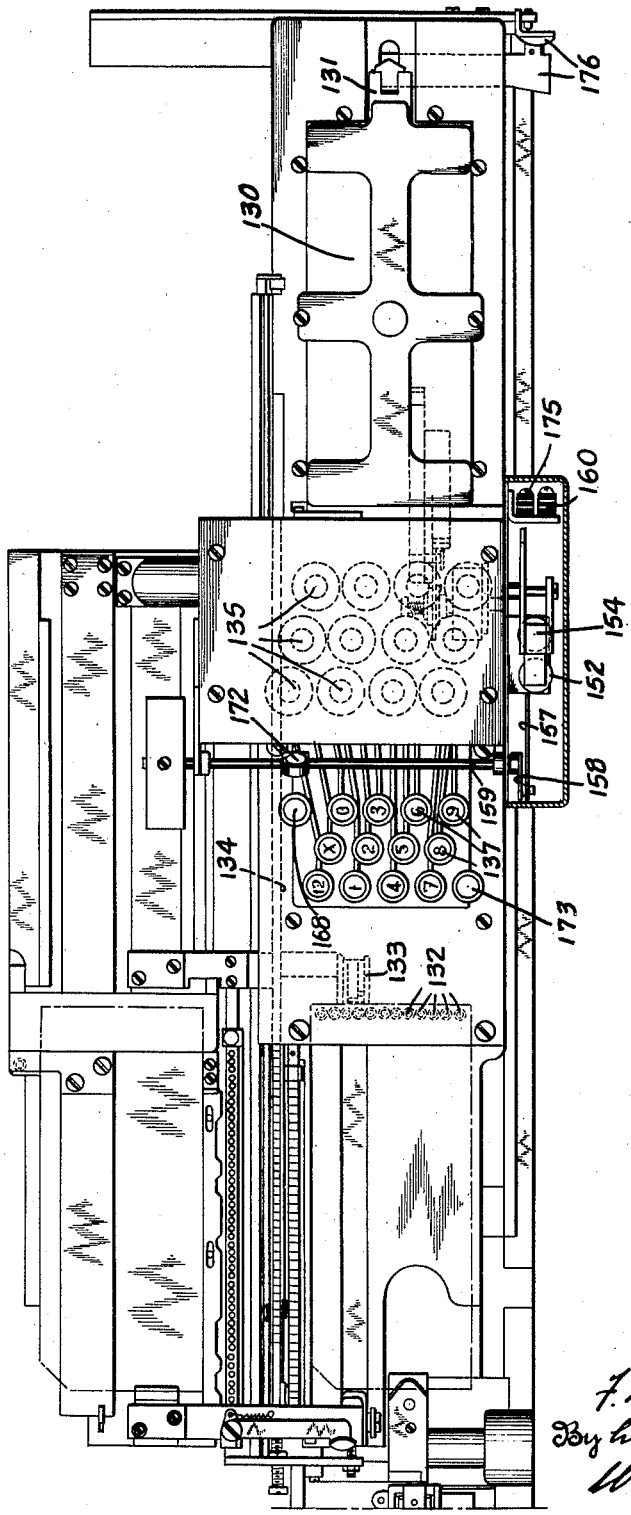
Fig. 17 is a plan view of the automatic card punch.
Figure 18:
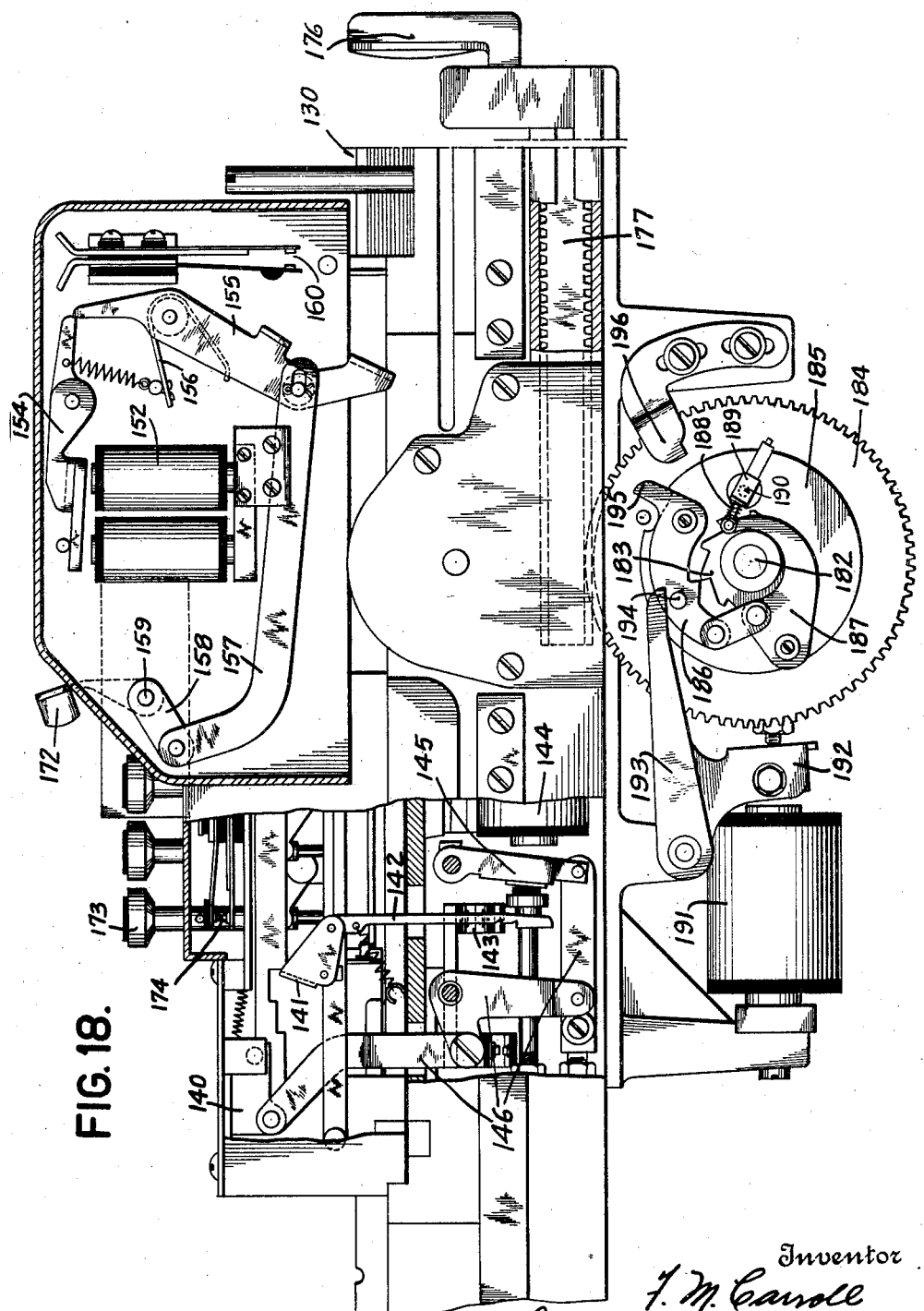
Fig. 18 is an outside view of the punch broken away to show certain interior parts.

In Figs. 17 and 18, the magnet 152 is adapted to rock a spring pressed armature 154 to release a lever 155 so that its spring 156 may rock it in a counterclockwise direction to actuate a link 157 and an arm 158 secured to a rod 159. The rocking of rod 159 will in a manner to be described cause the ejection of the card just punched from the machine and the introduction of a new card. In the meantime, it is desirable to interrupt the feeding of the tape 24, through the analyzing device until such new card is in position to receive the following entries. To this end the lever 155 is adapted upon release by the magnet 152, to close a contact 160 which as in Fig. 23 establishes a circuit through magnet 123 from line 82, wire 162, magnet 123, contact 160, resistance 163, to line 84. Energization of magnet 123 attracts its armature (see Figs. 12, 14 and 16) to rock lever 128 thereby moving member 117 out of frictional contact with pulley 119. The operation of the parts and the timing is such that when the tape feeding rollers 114 come to rest the perforation 52 in the tape will have advanced beyond brush 108a and an unperforated section of the tape will lie under the other brushes.

Automatic card feeding

Figure 19:
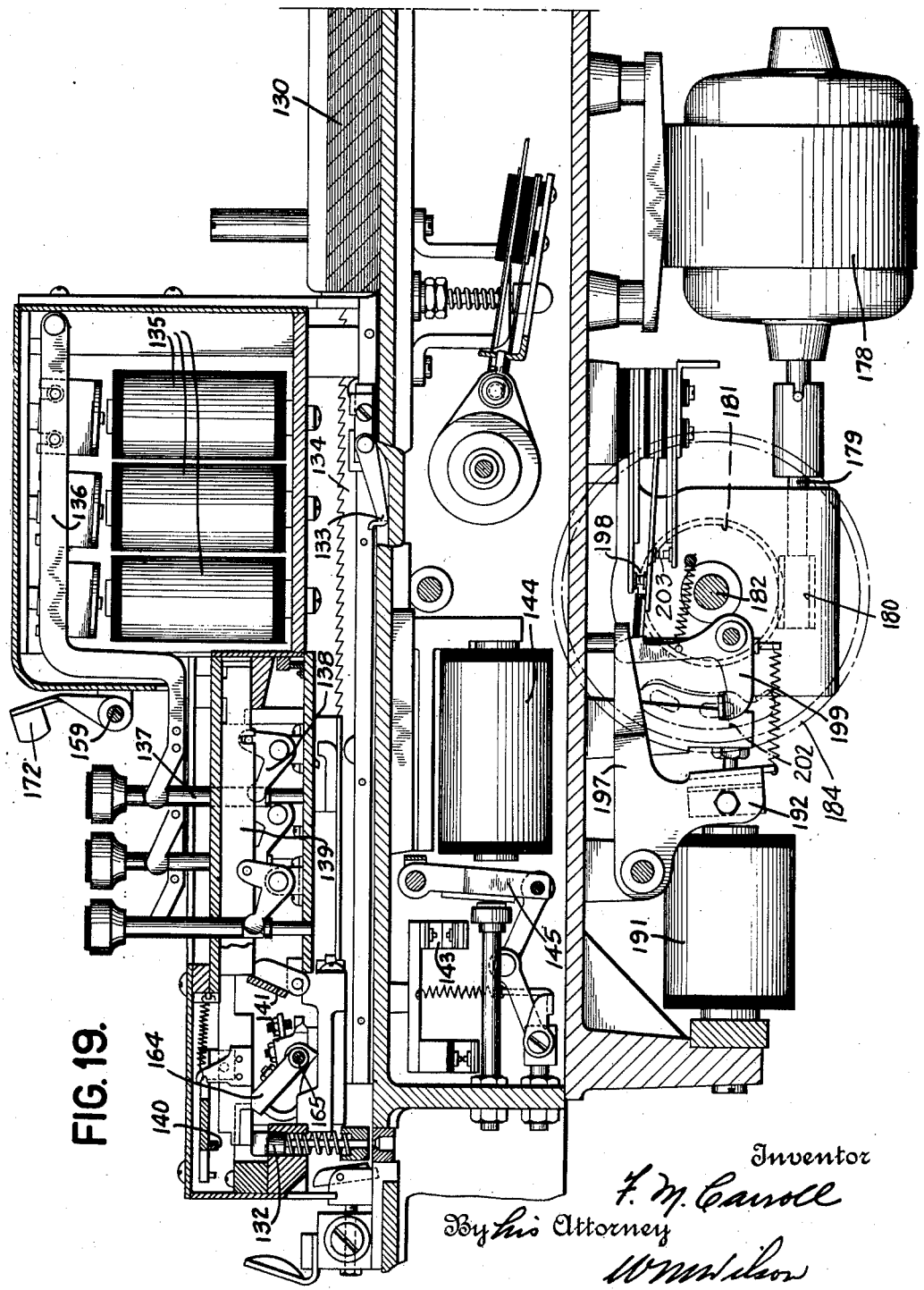
Fig. 19 is a cross-section of the punch.

In Figs. 19 and 20 the depression of any interposer bar 139 to cause punching will also rock an arm 164 mounted on rod 165. This causes an escapement device comprising pawls 166 and 167 to permit step by step advance of the carriage rack 134 in a manner more fully explained in the application referred to.

A release key 168 is provided which upon depression is adapted through bell crank 138a to move a member 169 to the right in Fig. 20 causing the member through its cam surface 169a to cam its free end upwardly on fixed plate 170 and by raising a finger 171 lift pawl 167 out of engagement with rack 134. This action releases the card carriage permitting it to advance under the influence of spring barrel 134a to which it is geared to a position as in Fig. 17 where the last column of the card is in punching position. This carriage releasing mechanism is well described in the copending application and need not be further described here. The energization of magnet 152, which causes the rocking of rod 159 (Figs. 17 and 18) will effect depression of release key 168 through a finger 172 secured upon rod 159.

Thus far we have seen that the sensing of the special perforation 52 caused interruption of the tape analysis and advancement of the card to its last column position. It remains to remove this card from the machine and to introduce a new card in position to receive entries therein. In the application cited this operation is initiated by depressing a space key 173 (Figs. 17 and 18) to close contacts 174. In the present invention a pair of contacts 175 (shown in Fig. 17) are provided which lie beside contacts 160 and are closed in the same manner by lever 155. These contacts are adapted to short circuit the hand operated contacts 174 and thus permit the card to be ejected immediately upon its arrival in last column position without the necessity of any further act on the part of the operator.

When the rack 134 occupies this last column position a projection 134b (Fig. 20) depending therefrom is adapted to maintain contact 205 closed while the rack remains in this position. A circuit may now be traced from right side of line 84, through contact 205, relay coil 204, contact 175, short circuiting space key contacts 174, wire 206, to line 82. Energization of relay 204 will close its points 204a to establish a circuit from line 84, contacts 205, relay coil 204, points 204a, magnet 300, wire 206, to line 82. This circuit will remain established until contacts 205 open due to the movement of the carriage rack 134 to the right.

The means provided for ejecting a complete punched card includes a gripper which comprises (Fig. 24) a pair of jaws 205a and 206a urged together by a flat spring 207, but the abutment of a pin 208 with the upper jaw 205a separates the jaws in order that the punched card may be received by the slit-like separation. The card occupies a position between the jaws at the termination of the punching of the last columns in the card.

The gripper unit is pivotally mounted on a shaft 209 to which is secured a gear 210 adapted to be driven by a gear 211 by an idler gear 212. Meshing with gear 211 is a slidably mounted rack 213 the extremity of which terminates in an adjustable cylindrical plunger 214. During the previous restoration of the carriage the end of rack 18 engaged plunger 214 to shift rack 213 to the left against the tension of a spring 215. This caused a clockwise movement of shaft 209 through the train of gears 210, 211, 212 to bring the gripper unit to the position shown in Fig. 24 whereupon a latch lever 216 will engage a shoulder 217 of the lower jaw 206a. At this time a certain amount of compression will be stored up in spring 215.

Shifting of latch 216 is effected by energization of the magnet 300 which attracts its armature when the magnet is energized. This causes a shifting movement of a link 219 to the right and by means of a cam shoulder 220 and arm 221 secured to the pivot shaft of latch lever 216 will shift the latter. This will result in a release of spring 215 to cause the counterclockwise rotation of the gripper unit. As the jaw 205a leaves pin 208 spring 207 will act to cause the latter to close upon the lower jaw 206a thus securely gripping the card and flipping the same in reversed position. A stationary pin 222 may suitably coact with one of the jaws to separate them, permitting the released card to fall in a receptacle 223.

Referring to the wiring diagram (Fig. 23) magnet 300, it will be recalled, is energized when relay points 204a are closed, and this depends upon closure of the last column contacts 205, and operation of the space key shunting contacts 175 under control of perforation 52 in the tape.

When the card just punched is ejected, shifting of rack 213 (Fig. 24) by release of spring 215 will cause a square shoulder 226 (Fig. 25) to engage a block 227 of insulating material to close contacts 301. These contacts, referring to Fig. 23, are in serial connection with the clutch trip magnet 191. Thus it will be clear that after the card has been ejected the motor restoring mechanism will be set into operation to automatically restore the card carriages without attention of the operator.

In Figs. 17 and 18, the picker 131 is connected through a handle 176 to a rack 177 which handle may be actuated to the left to introduce a new card from the magazine 130 to punching position.

Secured to the underside of the base of the machine is a motor 178 (see Fig. 19) having a clutch connection to a stud shaft 179 to which is secured a worm 180 meshing with a worm wheel 181 secured to a shaft 182 one end of which has secured thereto a ratchet-shaped clutch element 183. Loosely mounted on shaft 182 is a gear 184 meshing with teeth on the underside of rack 177 and to which gear is secured a disk 185. Pivoted upon the disk 185 is an arm 186 having a single clutch tooth. The free end of arm 186 is connected by a link to a toggle plate 187, the end of the toggle plate distant from its pivot being articulated to a rod 188, slidably mounted in a member 189 pivoted at 190 upon the disk 185. The parts are spring held in the position of Fig. 18 which they occupy normally. By virtue of this construction rod 188 and plate 187 act as a toggle, the spring acting to impositively hold the tooth of arm 186 in or out of engagement with the clutch teeth of ratchet wheel 183.

For the purpose of effecting the clutching action, a magnet 191 is provided and when energized attracts an armature 192 so that an arm 193 engaging the pin 194 of arm 186 will rock the tooth thereon into engagement with ratchet wheel 183. Through the connecting link the toggle connection will be moved centrifugally to its other position wherein the spring on rod 188 will act to hold the clutch tooth in engagement with the ratchet teeth. Gear 184 will thereupon be driven in a counterclockwise direction substantially a single revolution, shifting rack 177 to the left just as if it were caused by movement of handle 176. This will similarly result in moving the card pushers and fingers to control the positioning of the cards.

At the termination of the counterclockwise movement of gear 184, a tail 195 will strike a projection 196 of a fixed plate to effect the disengagement of the arm 186 and ratchet wheel 183 by a reverse action.

Also secured to the pivot of armature 192 is an arm 197, the free end of which is adapted to bear upon an insulating block to open contacts 198 when magnet 191 is energized. Contacts 198 are retained open by a latching bell crank 199 which is adapted to be struck by bent-up plate 202 secured to gear 184 at the termination of the driving movement of the latter. Below contacts 198 are motor-control contacts 203 which are latched closed upon energization of magnet 191 to complete the motor circuit and are unlatched to stop the motor at the termination of the driving operation in the manner just described. Contacts 198 open the circuit through magnet 198a whose purpose when energized is to hold brushes 201 against contact roll 200. When deenergized this magnet permits the brushes to move away from the roll. This action takes place during the return movement of the carriage for the purpose of preventing damage to the brushes. In the circuit diagram it will be observed that the circuit through magnet 204 may be closed from line 82, wire 206, through the closure of space key contact 174, magnet 204, contact 205 to the other side of line 84.

As we have seen heretofore the special perforation 52 of the tape 24 by causing the energization of magnet 152 causes the closing of contacts 175 which by inspection of the circuit diagram are seen to short circuit the space key contact 174 and effect the same results. That is, closure of the contact 175 will cause the energization of relay magnet 204 and consequently closure of the related contacts 204a, so that upon the presentation of the special perforation 52 to the tape analyzing brush 108a, a circuit will be established through the magnet 300, from the line 82, wire 206, magnet 300, relay contacts 204a, relay 204, contacts 205, back to line 84. When magnet holder is energized, certain mechanism will be set in operation to cause the ejection of the card from the punching position to a magazine 130a (see Fig. 1) which ejecting operation is more fully described in the cited application. The result of the energization of magnet 300 will cause power restoration of the card feeding devices and introduction of a new card into position ready to receive entries under control of the tape 24. In the circuit it is apparent that the closure of the contacts 203 complete a direct circuit through the motor 178, from line 82, through contacts 203 to the other line 84.

Referring to Fig. 18, the handle 176 which moves to the left during a card feeding cycle of operation, is adapted to engage the free end of arm 155 to restore it to latched position as shown.

As has been heretofore set out, the tightening of the tape 24 as it passes from the adding machine to the analyzing brushes is adapted to interrupt the tape feeding. Provision is made, however, to permit the completion of the analysis of the particular section of tape under the brushes and to replace the card associated therewith. In Fig. 23, the opening of contact 125 de-energizes magnet 122 releasing its armature 126 (Figs. 12, 14 and 16) so that upon energization of magnet 123, its armature 128 will be latched in the position of Fig. 16 through arm 127, whose upper end engages a fixed part of the frames. Armature 128 will remain latched in this position until sufficient slack has accumulated to again cause energization of magnet 122.

While there have been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

I claim:

1. In combination with an adding machine, means controlled by said adding machine for perforating a record strip in multi-columnar sections, each section corresponding to an operation of the adding machine, and means controlled by the adding machine for indicating upon said strip the limit of each section.

2. In combination with a key set, handle operated accounting machine, having registering devices arranged to receive an entry of an item set up by the keys on the operation of the handle, a punching device controlled by said keys, a second punching device with punches for punching tabulating cards with the items registered in said accounting machine, a record strip adapted to be perforated by said first named punches upon the operation of the accounting machine under control of the keys, means also controlled by the operation of the accounting machine for analyzing said record strip, and means for electrically controlling the operation of the punches in said second punching device under control of said record strip.

3. In a machine of the class described, in combination, an adding machine adapted to perforate a section of a record strip for each operation of said adding machine, a punching device including means for automatically feeding a tabulating card to punching position, means for ejecting said card after a punching operation, and means controlled by said record strip and said adding machine for initiating the automatic operation of said punching device.

4. In an apparatus of the class described, an adding machine having an operating cycle comprising an initiating operation and a restoring operation, a record strip punching device comprising differentially positionable punches, means for moving said punches into position, means operated by said adding machine during its initiating operation for effecting actuation of said punches to perforate said record strip, a card punching device comprising electrically operated actuating means, and controlling means therefor controlled by said record strip subsequent to said first named record strip and said adding machine perforating operation.

5. In a machine of the class described, an adding machine, including a key board having keys adapted to be set in accordance with an item to be entered in said adding machine, means for perforating a record strip in accordance with said key-board set-up upon operation of the adding machine, an analyzing device, means controlled by said adding machine for advancing said strip to said analyzing device, a card punching device adapted to perforate a record card column by column, and means controlled by said analyzing means for effecting the operation of said card punching means.

6. In a machine of the class described, adding mechanism, a storage device comprising a continuous record strip, perforating mechanism controlled by said adding mechanism during an operation thereof for simultaneously perforating in a plurality of columns on said strip, analyzing means controlled by said adding mechanism for analyzing said strip column by column during a subsequent operation of said adding mechanism and means controlled by said analyzing means for controlling the preparation of a separate record card for each adding machine operation.

FRED M. CARROLL.